March 12, 1929.  O. W. BRENIZER  1,705,233
CABLE SUPPORT
Filed Jan. 14, 1928   2 Sheets-Sheet 1

INVENTOR:
Orson W. Brenizer
BY
ATTORNEY

March 12, 1929.　　O. W. BRENIZER　　1,705,233
CABLE SUPPORT
Filed Jan. 14, 1928　　2 Sheets-Sheet 2

INVENTOR:
Orson W. Brenizer
BY
ATTORNEY

Patented Mar. 12, 1929.

1,705,233

UNITED STATES PATENT OFFICE.

ORSON W. BRENIZER, OF PHILADELPHIA, PENNSYLVANIA, ASSIGNOR OF ONE-FOURTH TO ANDREW V. GROUPE, OF PHILADELPHIA, PENNSYLVANIA.

CABLE SUPPORT.

Application filed January 14, 1928. Serial No. 246,718.

This invention relates to improvements in cable supports wherein spaced hangers each formed of wire and having a cable receiving loop are suspended at intervals from a messenger wire for receiving and supporting a cable, the messenger wire being supported at widely spaced points throughout its length.

Cable hangers in general use have been constructed of wire forming a loop for receiving and supporting the cable and having upwardly extending side portions connected to a messenger wire, and it has been the practice to support the cable directly upon the loop of the hanger. This has been objectionable because of the relative movement which takes place between the cable and the hanger due to the swaying of the cable by the action of the wind and due to the longitudinal displacement of parts of the cable under the influence of the expansion and contraction thereof, such relative movement causing the hanger to cut and otherwise mar the lead sheathing of the cable.

The object of my present invention is to overcome the aforesaid objection by the provision of a cable supporting saddle which is related to a hanger in such manner that it will support a cable therein and move with the cable relatively to the hanger in directions both longitudinally and transversely of the cable and in other directions which are the resultants of compound longitudinal and transverse movements, whereby the cable may be permitted to move and adjust itself to different positions without creating any friction between the cable and the hanger.

The invention consists in the novel construction, combination and arrangement of elements hereinafter described and claimed.

In the accompanying drawings, illustrating the invention,

Figure 1:
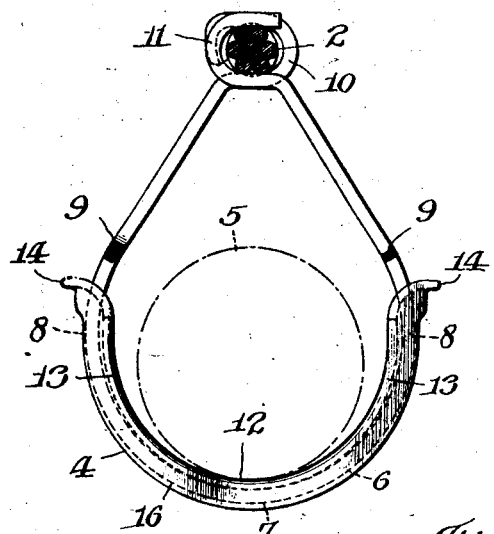
Figure 1 is a transverse section through a messenger wire provided with a hanger and a saddle embodying the invention, showing by dot-and-dash lines the position of the cable upon the saddle.

Referring to the drawings, 2 designates the messenger wire, 3 the cable hanger, 4 the cable supporting saddle and 5 the cable.

The hanger 3 is formed of suitable wire and it includes a cable receiving loop 6 having a bottom portion 7 and upwardly extending side portions 8.

The upper end portions of the side portions 8 of the loop may be connected to the messenger wire 2 by any suitable means. The means herein illustrated for this purpose comprises hooks 10 and 11 which are formed on the respective upper end portions of the side portions 8 of the hanger loop 6 and which are constructed and applied to the messenger wire 2 to connect the hanger thereto and to prevent displacement of the hanger relatively to the messenger wire the same as the similarly designated hooks of the cable support or hanger shown and described in my previous Letters Patent No. 1,373,166, dated March 29, 1921, to which reference may be had.

Figure 2:
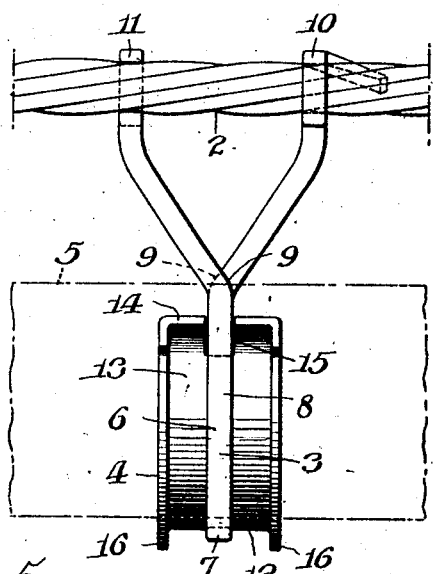
Figure 2 is a side view of the parts shown in Fig. 1.
Figure 3:
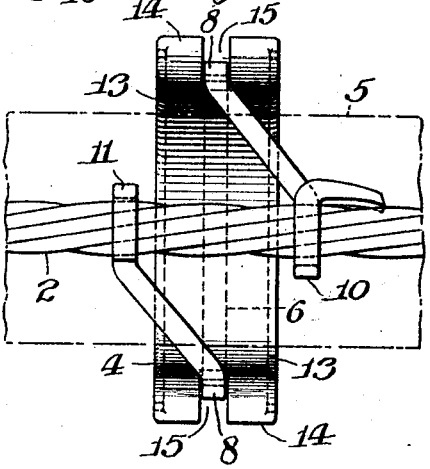
Figure 3 is a top view of the parts shown in Fig. 2.

The lower portion of the loop 6 or that portion thereof which receives the saddle 4 extends transversely at right angles to the messenger wire 2 and cable 5. The side portions 8 of the loop 6 are bent forming shoulders 9 above the upper ends of the side portions of the saddle 4, and the side portions 8 of the hanger diverge above the shoulders 9 from the plane of the lower portion of the loop 6 to properly space the hooks 10 and 11 longitudinally of the messenger wire, as shown in Figs. 2 and 3.

Figures 4, 5:
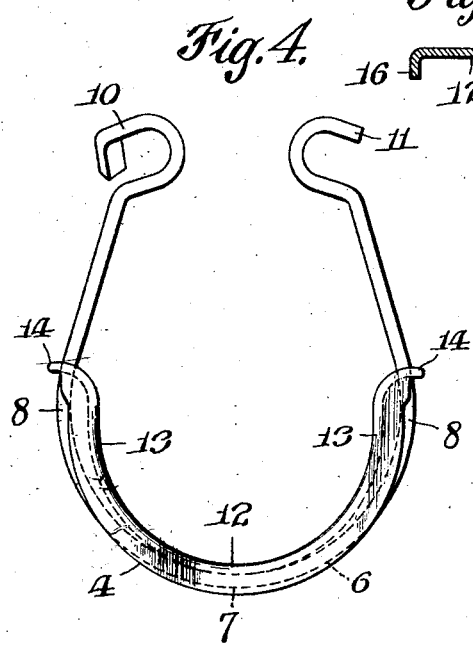
Figure 4 is a view of the hanger and the saddle showing the relation of the parts thereof before the hanger is applied to the messenger wire.
Figure 5 is a transverse section through the bottom portion of the saddle.

Before the hanger 3 is applied to the messenger wire, as shown in Fig. 1, the hooks 10 and 11 of the hanger are spaced apart, laterally of the messenger wire, as shown in Fig. 4, and the hanger loop 6 is more open with its side portions 8 more widely separated than as shown in Fig. 1 when applied to the messenger wire. This is the normal condition of the hanger, as shown in Fig. 4; and, when the hanger is applied to the messenger wire 2, the side portions 8 of the loop 6 are sprung toward each other and the hooks 10 and 11 are caused to grip the messenger wire by the tendency of the hanger loop to resume its more open or normal condition shown in Fig. 4, the character of the wire forming the hanger being sufficiently resilient to permit the side portions 8 of the loop 6 to be sprung toward each other from the position shown in Fig. 4, more than enough to permit the application of the hanger to the messenger wire without springing the hanger loop 6 beyond its elastic limit.

The cable supporting saddle 4 is U-shaped in general formation as seen in Figs. 1 and 4, for the reception of the cable 5 and to conform generally to the lower portion of the hanger loop 6, and the saddle 4 comprises a bottom portion 12 and upwardly extending side portions 13.

The upper end portions 14 of the saddle side portions 13 are bifurcated and turned outwardly in opposite directions providing openings 15 therein for the reception of the side portions 8 of the hanger loop 6; and the saddle 4 is provided with two laterally spaced parts or flanges 16 below the upper end portions 14 thereof, forming a channel for the reception of the lower portion of the hanger loop 6.

The lower portion 12 of the saddle 4 rests upon the lower portion 7 of the hanger loop 6, and the main body of the saddle 4 is of plate-like form, presenting a broad bearing surface in all parts thereof which face or receive the cable 5 or which are likely to come into contact with the cable while it is being drawn through the saddle or being supported thereby.

Figure 8:
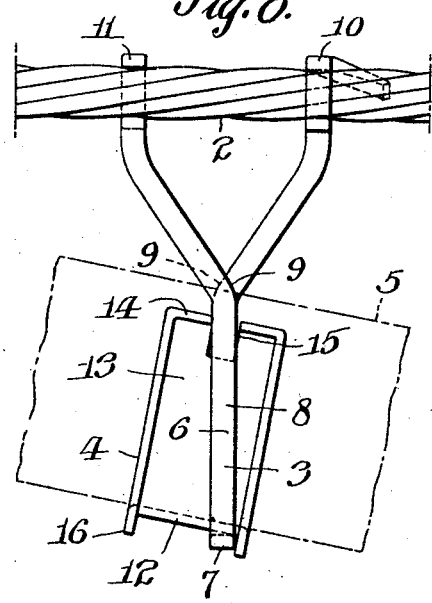
Figures 8 and 9 are views similar to Fig. 2, showing different positions of the saddle within the hanger loop in directions longitudinally of the cable.
Figure 9:
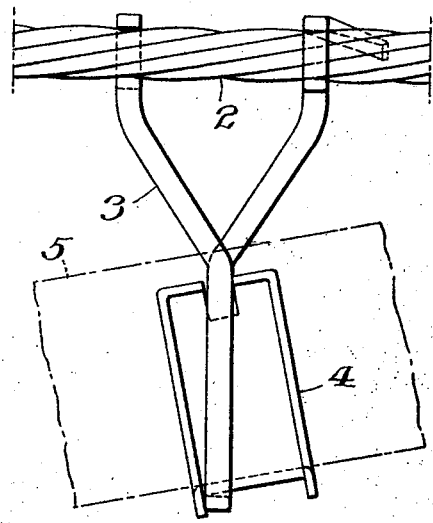

The open outer ends of the openings 15 of the saddle permit the saddle to be easily and quickly applied to the hanger 3 and permit the hanger and the saddle to be shipped separately to destinations for use; and the side walls of the openings 15 are fitted to the sides of the hanger therein in a manner to prevent any substantial movement of the upper ends of the sides of the saddle in directions longitudinally of the cable and to permit the bottom portion 12 of the saddle to move in such directions by a rocking action over the bottom portion 7 of the hanger loop 6, the space between the saddle projections or flanges 16 being sufficient to permit such rocking action in directions longitudinally of the cable 5 to either the position shown in Fig. 8 or to the position shown in Fig. 9, or to any position between them. The flanges 16 act as abutments to limit the extent of the rocking movements of the saddle and to prevent displacement of the lower portion of the saddle from the lower portion of the hanger loop in directions longitudinally of the cable.

This rocking action of the saddle relatively to the hanger permits the broad bearing surface of the saddle to adjust itself to the opposing surface of the cable when the cable is being drawn through the saddle, when the cable is finding its seat upon the saddle after being drawn through the same and when the cable is swayed laterally by the action of wind or moved by other forces and when that portion of the cable resting upon the saddle is moved longitudinally with respect to the hanger under the influence of the expansion and contraction of the cable.

The saddle 4 is rigid and substantially unyielding, and, as previously described, the hanger 3 is resilient to permit its application to and removal from the messenger wire 2 and to cause it to grip the messenger wire. When the hanger loop 6 is in the open or normal condition, as shown in Fig. 4, the saddle 4 may be easily applied thereto, and when the hanger 3 with the saddle therein is applied to the messenger wire 2, the side portions 8 of the hanger are sprung from the spaced relation to the side portion 13 of the saddle 4, as shown in Fig. 4, to the close relation thereto, as shown in Fig. 1, thus closely confining the saddle 4 within the hanger loop 6.

Figure 6:
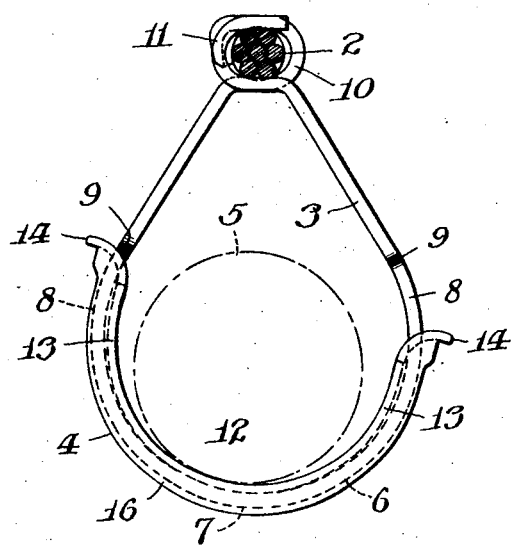
Figures 6 and 7 are views similar to Fig. 1, showing different positions of the saddle within the hanger loop in directions transversely of the cable.
Figure 7:
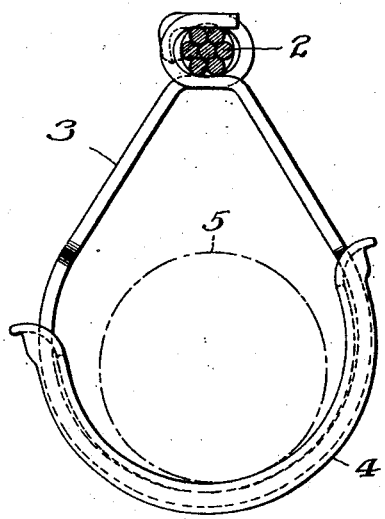

When the parts are assembled, as shown in Figs. 1 and 2, the shoulders 9 on the hanger 3 are located above and in spaced relation to the upper end portions 14 of the side portions 13 of the saddle 4 to permit the saddle to slide or move curvilinearly along the curved lines of the hanger loop in directions transversely of the cable 5 to either the position shown in Fig. 6 or to the position shown in Fig. 7 or to any position between them. The shoulders 9 act as abutments to limit the extent of the curvilinear movements of the saddle and to prevent displacement of the saddle from the hanger 3.

The weight of the cable 5 upon the saddle 4 causes the saddle to be moved by and with the cable when it is supported by the saddle after being drawn through the hanger loop and when the forces hereinbefore referred to move the cable within limits in directions longitudinally or transversely thereof or in directions which are the resultants of compound longitudinal and transverse movements, thereby saving the cable from being cut or otherwise marred by the hanger.

The saddle 4 is preferably made from a sheet metal punching formed as illustrated, having the flanges 16 formed by bending the lateral edge portions of the main body of the saddle flatwise to extend therefrom substantially at right angles thereto around the major portion of the saddle so that the flanges 16 will have a U-shaped form following the form of the main body of the hanger and providing a U-shaped groove or channel between them through which the lower portion of the hanger loop 6 extends. The flanges 16 stiffen the entire saddle and the end portions 14 are formed by bending the sheet metal flatwise to extend outwardly from the upper ends of the U-shaped body of the saddle so that each end portion 14 forms an ogee curve with the main body portion of the saddle. By thus forming the saddle of sheet metal smooth, rounded surfaces are presented to the cable where the flanges 16 and the upper end portions 14 of the saddle 4 are joined to the main body thereof so that no rough or sharp corners can come in contact with the cable at any time to mar or injure the same.

I claim as my invention:

1. The combination of a wire cable hanger comprising a cuved resilient cable receiving loop having a bottom portion and upwardly extending side portions provided with hooks on the upper end portions thereof for connecting them to a messenger wire, and a substantially rigid cable supporting saddle comprising a body having a bottom portion supported upon the bottom portion of the hanger loop and having upwardly extending side portions within the hanger loop adjacent to the side portions thereof, the side portions of the hanger loop being movable toward and from the side portions of the saddle and the saddle having means to prevent lateral displacement thereof from the hanger loop, and the side portions of the hanger loop having abutment parts below the hooks thereof and above and spaced from the upper ends of the side portions of the saddle permitting curvilinear movement of the saddle along the curved lines of the hanger loop and limiting the extent of such movement.

2. The combination of a wire cable hanger comprising a curved resilient cable receiving loop having a bottom portion and upwardly extending side portions provided with hooks on the upper end portions thereof for connecting them to a messenger wire, and a substantially rigid cable supporting saddle comprising a body having a bottom portion laterally movable upon the bottom portion of the hanger loop and having upwardly extending side portions within the hanger loop adjacent to the side portions thereof, the side portions of the hanger loop being movable toward and from the side portions of the saddle and the saddle having abutment parts for engagement with the hanger for limiting the extent of the lateral movement of the saddle and the side portions of the hanger loop having abutment parts below the hooks thereof and above and spaced from the upper ends of the side portions of the saddle permitting curvilinear movement of the saddle along the curved lines of the hanger loop and limiting the extent of such movement.

In testimony whereof I affix my signature.

ORSON W. BRENIZER.